United States Patent [19]

Cooney et al.

[11] Patent Number: 5,422,943

[45] Date of Patent: Jun. 6, 1995

[54] PRIVATE BRANCH EXCHANGE NETWORKS

[75] Inventors: Thomas M. Cooney, Lyons; Kenneth E. English, Naperville; James L. Turner, Lemont; Robert M. Welsh, Westmont; Kathleen C. Whildin, Sugar Grove, all of Ill.

[73] Assignee: AT&T Corp., Murray Hill, N.J.

[21] Appl. No.: 954,189

[22] Filed: Sep. 30, 1992

[51] Int. Cl.[6] ............... H04M 7/00; H04Q 11/04; H04J 3/12

[52] U.S. Cl. ................ 379/225; 370/58.1; 370/110.1; 379/220; 379/224; 379/229; 379/230; 379/231; 379/234

[58] Field of Search .............. 370/58.1, 110.1; 379/219, 220, 224, 225, 229, 230, 231, 232, 234

[56] References Cited

U.S. PATENT DOCUMENTS

| | | | |
|---|---|---|---|
| 3,544,728 | 12/1970 | Rodkin | 379/225 X |
| 5,062,103 | 10/1991 | Davidson et al. | 370/58.1 |
| 5,159,594 | 10/1992 | Bales et al. | 370/110.1 |
| 5,182,751 | 1/1993 | Bales et al. | 370/94.1 X |
| 5,255,314 | 10/1993 | Applegate et al. | 379/225 X |
| 5,305,312 | 4/1994 | Fornek et al. | 370/110.1 X |

OTHER PUBLICATIONS

D. Bushaus, "Users Eye PRI ISDN", *Communications Week*, Mar. 4, 1991, p. 28.
C. Roeckl, "Future Frisco Net", *Communications Week*, Mar. 19, 1990 p. 1.
C. Medford, "Howard U. Combines Centrex, PBX To Integrate Network", *MIS Week*, May 21, 1990, p. 16.

*Primary Examiner*—James L. Dwyer
*Assistant Examiner*—Harry S. Hong
*Attorney, Agent, or Firm*—Werner Ulrich

[57] ABSTRACT

Customers that have groups of stations served from multiple digital switching systems, which frequently include mixtures of PBXs and Centrex, require capabilities that will allow those station groups to operate as one global group. This invention permits customer station groups, including PBXs and Centrexes interconnected by private facilities or by the public switched telephone network (including long distance carriers), to act as a single entity that supports integrated voice and data communications. Advantageously, Integrated Services Digital Network (ISDN) Primary Rate Interface (PRI) facilities are used to carry the communications and signaling to and from the PBXs.

21 Claims, 5 Drawing Sheets

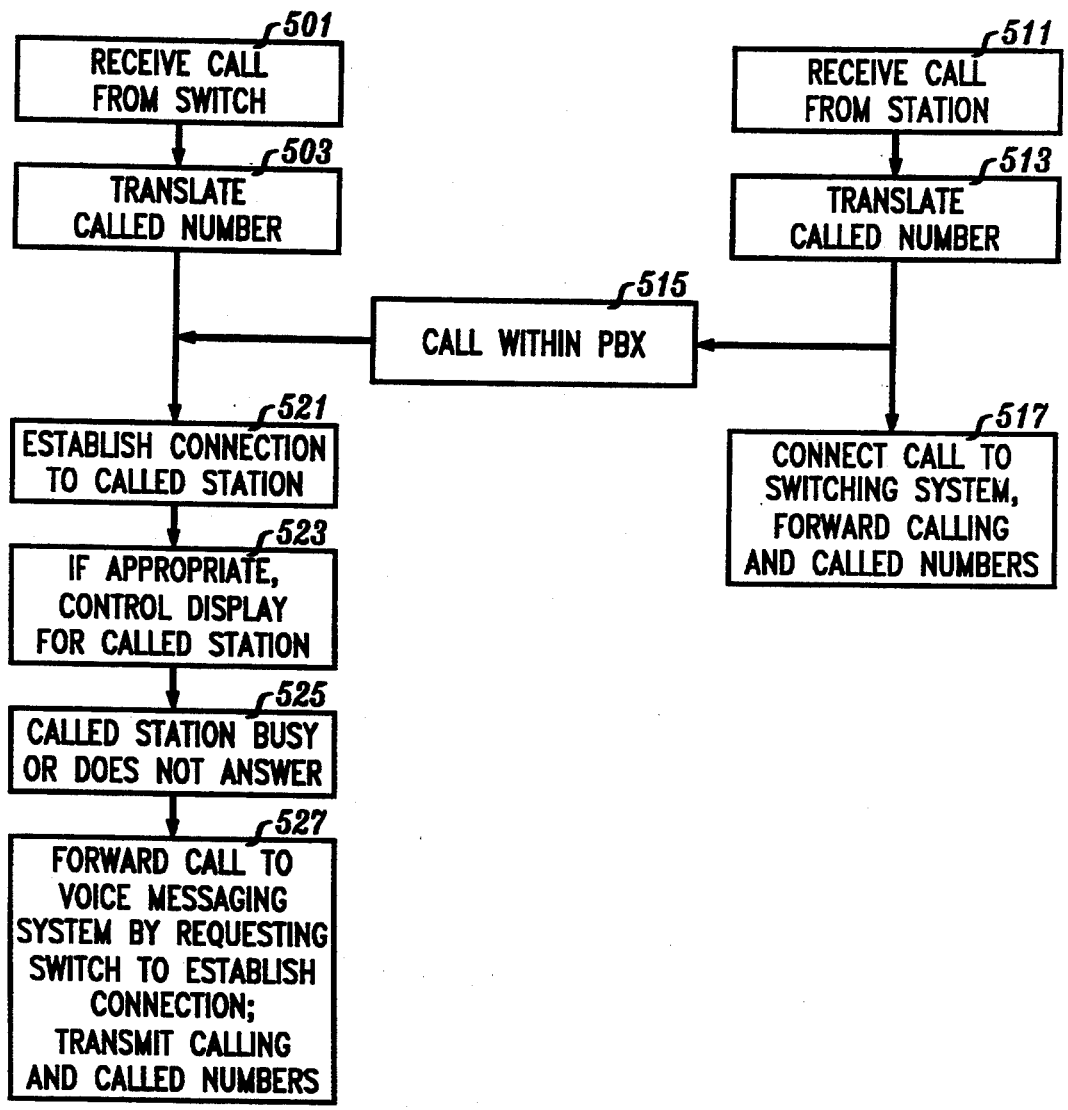

PRIVATE BRANCH EXCHANGE NETWORKS

TECHNICAL FIELD

This invention relates to telecommunications networks for serving a single customer from a plurality of private branch exchanges (PBXs) and/or Centrexes using integrated voice and data signals.

PROBLEM

Among the most important customers of telecommunications common carriers, such as telephone companies, are those customers whose operations are scattered in a number of physically separated locations but whose work is becoming increasingly more integrated. Typically, such customers have both a very high volume of intra-location traffic and a substantial volume of inter-location traffic. An ideal arrangement would provide for ease of dialing of inter-location calls; for ability to serve ordinary (analog) telephones as well as a few or many premium telephones, such as integrated services digital network (ISDN) telephones; and for minimization of charges for inter-location calls. A problem of the prior art is that there is no arrangement for providing low cost intra-location service and cost effective integrated voice and data inter-location service for a multi-location customer.

SOLUTION

The above problem is solved and an advance is made over the prior art in accordance with our invention wherein the telecommunications users of a large customer in one location are interconnected by a private branch exchange (PBX) and that PBX is connected with other locations and with the public switched telephone network by an integrated voice and data facility to a local switching system. Advantageously, such an arrangement provides for low cost intra-location telecommunications connections and, through the integrated voice and data connection, provides the capabilities for access to a broad range of services provided from the local switching system for interconnecting with other locations and with the public switched telephone network.

In accordance with one feature of the invention, two PBXs of the customer are connected by one or more dedicated primary rate interface (PRI) facilities when the traffic between these PBXs warrants such a connection. Also, private PRI facilities are provided, where traffic warrants, to interconnect serving switches connected to different PBXs of the customer, to carry inter-PBX traffic for the customer.

In accordance with one aspect of the invention, the integrated voice/data interface is an ISDN PRI. Advantageously, the PRI provides a cost effective arrangement for transporting station originated voice or data and station or switch originated signaling or control data between the local switching system and the PBX.

In accordance with one aspect of the invention analog telephones, ISDN telephones, or a mixture are supported by the PBX. The system further supports inter-PBX and PBX to Centrex ISDN-to-ISDN connections.

In accordance with another aspect of this invention, a uniform numbering plan is provided throughout the customer's private network. Information is available in the local switch to route calls to numbers not recognized by the PBX.

In accordance with another aspect of the invention, calling number display for inter-location calls is implemented by sending the identification of the caller from the calling PBX over the PRI to the local switch. This information is then transmitted via a signaling system 7 network or a PRI interconnecting the local switches serving the originating and terminating PBX and then transmitted via the PRI connected to the terminating PBX for display at the customer's ISDN or analog telephone.

Further, detailed signaling information such as a call forwarding indication and the identification of the name of the calling party recorded at the local switch connected to the originating PBX is similarly transmitted.

In accordance with another aspect of the invention, a common voice messaging system is used by some or all of the PBXs of the customer network. The signaling arrangement discussed above is used to control the called stations message waiting lamp or other indicator.

In accordance with another aspect of this invention, remote access to private facilities is made possible by accessing these private facilities via the PRI connection from the originating PBX to the connected local switch and using connections from the local switch to the switch or PBX connected to the private facility.

In accordance with another aspect of the invention, common group restrictions are advantageously implemented at the local central office connected to the PBX. The group of the caller is identified from the caller's number transmitted over the PRI to the connected local switch.

BRIEF DESCRIPTION OF THE DRAWING

FIGS. 2-5 are flow diagrams of operations performed by switching systems and PBXs in support of applicants' invention.

DETAILED DESCRIPTION

Figure 1:
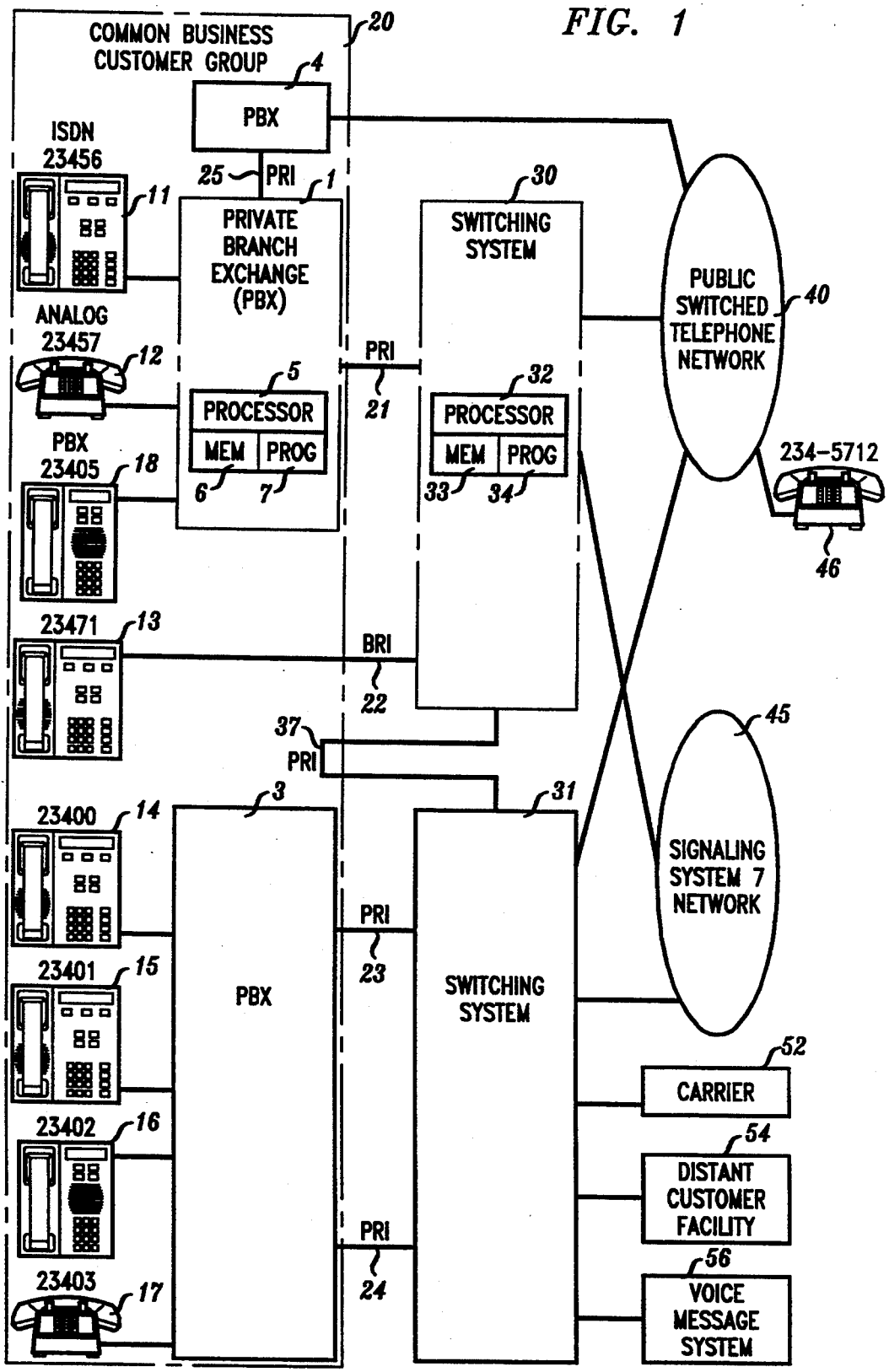
FIG. 1 is a block diagram of a customer telecommunications network illustrative of applicants' invention.

FIG. 1 is a block diagram of the hardware of applicants' invention. PBXs 1, 3 and 4 are program controlled PBXs, such as the Definity ® System manufactured by AT&T. For example, PBX 1 comprises a processor 5, including memory 6 and a control program 7. PBXs 1, 3, and 4 all serve the stations of a single business or other entity, and are called herein a common business customer group 20. PBX 1 is connected via primary rate interface (PRI) facility 21 to switching system 30 and PBX 3 is connected via primary rate interfaces 23 and 24 to switching system 31. PBX 1 serves ISDN station 11 and analog stations 12 and 18. Analog station 18 has a display. ISDN station 13, a Centrex line, is connected by a basic rate interface (BRI) 22 directly to switching system 30. Switching system 31 serves ISDN stations 14 and 15 and analog stations 16 and 17. PBX 4 is part of the customer group but is accessible only via the public switched telephone network (PSTN) 40, and, from PBX 1 via the private PRI facility 25. Switching systems 30 and 31 are program controlled switching systems such as the 5ESS ® switch manufactured by AT&T. In switching system 30 is shown processor 32 including memory 33 and program storage 34 for controlling switching system 30. Switching systems 30 and 31 are connected by a direct connection over facility 37, dedicated to the customer of PBX 1, 3, and 4, carrying a PRI signal and are also both connected to the PSTN 40 and a Signaling System 7 network 45. The PSTN network is also used for accessing any station outside the customer group, such as analog station 46.

An intra-PBX call, for example between stations 16 and 17, is set up within PBX 3. A call from station 12 to station 16 is set up via PBX 1 which transmits call control and signaling information over the D-channel of PRI 21 to switch 30. Part of the information that is transmitted is the identity of the called station (station 16) and another part is the identity of the calling station (station 12). To access station 16, a signaling message is transmitted over PRI 37 to switching system 31 to signal the request to connect a call on one of the channels of the PRI to analog station 16. The identity of the calling station is also signaled over the PRI using the conventional ISDN signaling protocol. Switching system 31 receives this signaling message, sets up a connection from a B-channel of PRI 37 to a B-channel of PRI 23. Switching system 31 signals PBX 3 over the D-channel of PRI 23 to set up a connection from a channel of PRI 23 to analog station 16 and to display the identity of the caller (including the caller's name obtained from memory by processor 32 of switching system 30) at the called analog station 16.

Analog stations 16 and 18 both have displays for displaying the calling number and, for example, for identifying whether a call is an incoming or an intra-customer group call. An example of such a telephone is the AT&T 7404 telephone station. Such telephones are usually designed to work directly with a PBX and have different arrangements for gathering the information for a display than the incoming calling line identification (ICLID) arrangement that is used for residential customer service. Stations 12 and 17 are simple analog stations without the capabilities for displays.

In this particular embodiment, switching system 31 is also connected to a number of specialized facilities. Switching system 31 is directly connected to a long distance carrier 52 to bypass the local exchange access network. Switching system 31 is also connected to a distant customer facility 54, for example, a remotely located customer branch via switched or unswitched private facility. Switching system 31 is also connected to voice message system 56. While blocks 52, 54, and 56 could also be connected to switching system 30, a connection from a single switching system is frequently more economical since such a connection allows all traffic from the customer group to be concentrated onto one transmission or access facility.

The numbering plan of this particular customer group is typical. A 5-digit number is used for making intra-customer group calls and calls to the public switched telephone network are requested by dialing 9 followed by a public switched telephone network directory number such as 234-5712 for accessing analog station 46. The 5-digit telephone numbers which are assigned to each telephone station connected to the PBXs of the customer group are usually the last 5 digits of the directory number used for accessing that station from the outside via the PSTN. While, in some PBXs the numbers of the stations are in one or more blocks of numbers, such an arrangement limits the flexibility of individuals to move from one PBX to another of the same customer group without changing their directory numbers. For this specific embodiment, therefore, it is assumed that any of the 5-digit numbers of the customer group of PBXs can be assigned to telephone stations in any of the PBXs of the customer group. In the specific example, therefore, telephones 11, 12, 18, 13, 14, 15, 16, and 17 have directory numbers 23456, 23457, 23405, 23471, 23400, 23401, 23402, and 23403. In this particular example, the user of telephone station 18 recently moved from PBX 3 to PBX 1 and was able to do so without changing her telephone number.

In this particular example, if station 11 dials 23457, the connection is set up within PBX 1 without involving switching system 30. If station 11 dials station 18, PBX 1 has the information for recognizing that the number 23405 is attached to PBX 1 and will also be able to establish the call without involving switching system 30. If station 23456 dials station 23471, PBX 1 recognizes that this is an intra-customer PBX group call to a station not served by PBX 1 and therefore passes the call to switching system 30 via PRI 21. Switching system 30 recognizes that this is a call to a station served directly as a Centrex line by switching system 30 and establishes a call via BRI 22 to station 23471. If station 23456 dials 23400, switching system 30 recognizes that station 23400 is served by a PBX connected to switching system 31 and passes the call to that switching system over PRI 37. The signaling channel of PRI 37 is used to identify both the calling and the called numbers and to identify the fact that this is an intra-PBX group call. Finally, if station 23456 dials 9 234-5712, the initial 9 is an indication to the PBX 1 that this is a call outside the PBX group and PBX 1 passes the call to switching system 30 as a call to directory number 234-5712. Switching system 30 recognizes that this is not to a station which it serves and passes the call to the public switched telephone network 40 for completion to analog station 46.

PRI 37 is a highly desirable facility for interconnecting switching systems 30 and 31 for inter-PBX traffic. The PRI facility can be used to transmit not only voice but also data traffic at rates of up to 64 kilobits (or more if multiple channels are used) and offers the availability of a 64 kilobit D-channel for transmitting control and signaling information concerning the calls between switching systems 30 and 31.

The connection between the switching systems 30 and 31 to the public switched telephone network 40 also provides the capability for overflow traffic in case of a failure of PRI 37 or even normal traffic between switching systems 30 and 31 for traffic between two PBXs of the same customer group. While such a connection is more expensive than a heavily used connection over PRI facility 37, as an overflow connection in particular, this is an efficient arrangement. Of course, if there is little traffic for the customer between systems 30 and 31, PRI 37 is not provided.

PBXs 1 and 4 are also interconnected by a private PRI facility 25. Overflow traffic between these two PBXs is carded via PSTN 40 and switching system 31.

Figure 2:
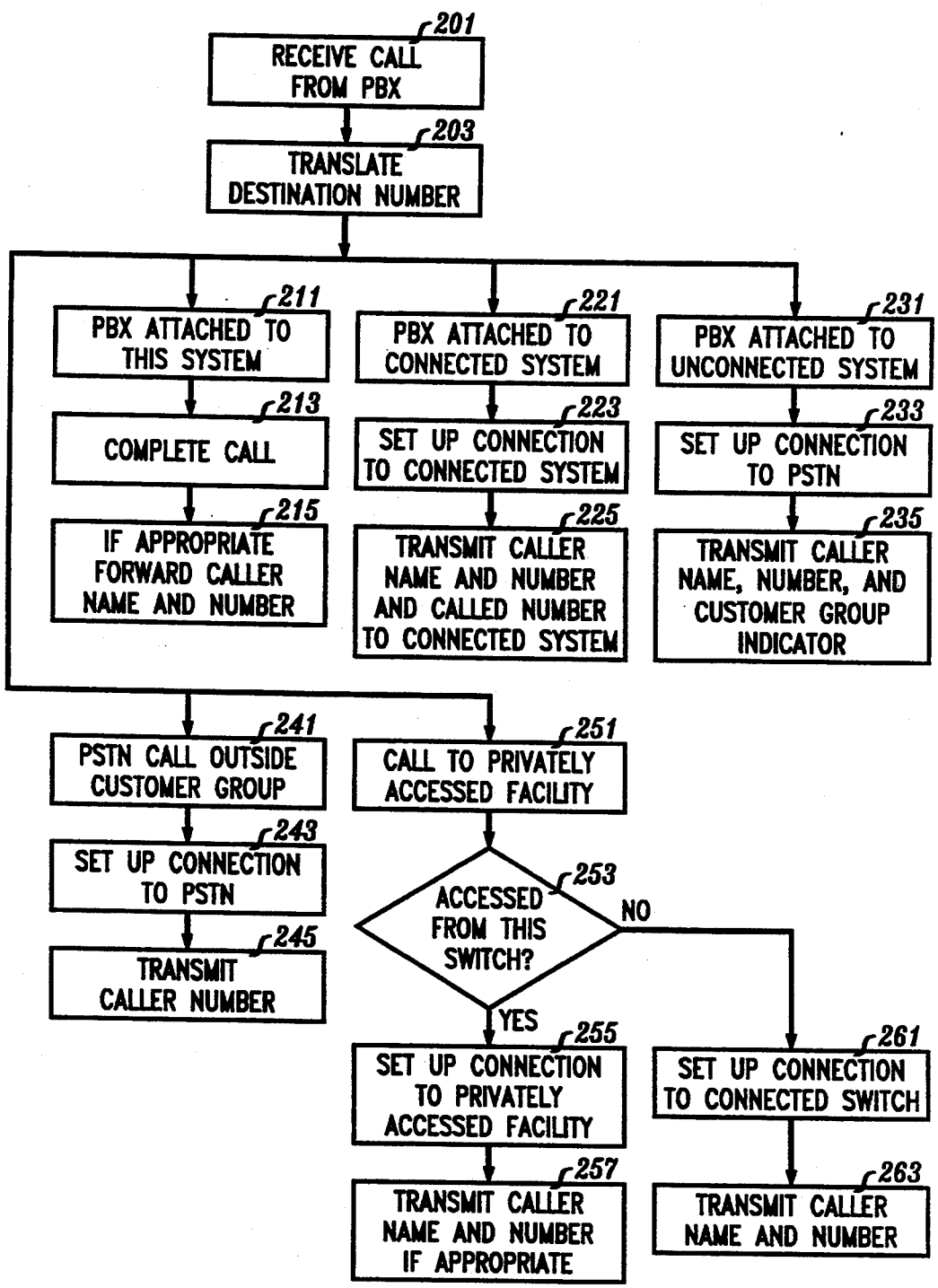

FIGS. 2-5 are flow diagrams of actions carded out by switching systems such as switching system 30 or in the case of FIG. 5, PBXs such as PBX 1, to implement applicants' invention. FIG. 2 is a flow diagram of actions carded out by switching system 30 when it receives a call from a PBX such as PBX 1. The call is received (block 201) and the switching system translates the destination number received with the call (action block 203). The result of the translation may be one of five outcomes described with respect to blocks 211, 221, 231, 241, 251, and their respective successor blocks. Block 211 is entered if the destination number is that of a telephone station served by a PBX served from this system. In that case, the call is completed to that PBX (action block 213 and if appropriate, i.e, if the destination telephone contains a display, the caller name and number is forwarded to the PBX for display on the called telephone station. Alternatively, the caller name and number can be transmitted from the switching system 30 regardless of the type of destination telephone station and the PBX will only operate displays for terminating telephone stations that have them.

If the result of translation 203 is that the destination station is found to be on a PBX served from a connected system (action block 221), then a connection is set up to the connected system (action block 223). The caller name and number and the called number are transmitted to the connected system to assist that system in setting up the terminating connection. The latter process is described in FIG. 3.

If the facilities to the connected system are busy or otherwise unavailable, then the actions initiated by block 231 are performed.

If the result of the translation is that the called station is served by a PBX attached to an unconnected system such as PBX 4 (action block 231), then a connection is set up to the public switching telephone network (action block 233). If the PSTN is used then the full called number (i.e., the 7 or 10-digit version) and not simply the 5-digit number must be provided to the PSTN. In addition the facilities of signaling system 7 can be used to transmit the caller name, number, and a customer group indicator (action block 235).

If the result of the translation of the destination number is that the switching system 30 recognizes that the call is to a number outside the customer group (action block 241), then a connection is set up to the public switched telephone network (action block 243) unless the call is to another telephone served by switching system 30 in which case the call can be directly completed. The caller number is transmitted (action block 245) in order to allow the terminating telephone station to receive an ICLID display.

If the result of translation 203 is the recognition that the call is to a privately accessed facility (action block 251), then test 253 is performed to determine whether this facility is accessed from this switch. If so, then a connection is set up to the privately accessed facility (action block 255) and the caller name and number is transmitted if appropriate (action block 257). If the privately accessed facility is a voice message system, then the called number is also transmitted. If the privately accessed facility is not accessed from this switch as determined in test 253, then a connection is set up to the connected system that does access this facility (action block 261) and the caller name and number as well as the called number are transmitted to the connected switch (action block 263). Before setting up a connection to the facility, a check is made as part of block 255 whether the caller is authorized to access this facility. This check is made by checking the translation data of the caller (class of service); usually, stations of the customer group are grouped into classes, each with its own access authorization pattern. The same type of test is made as part of blocks 355 and 455.

Figure 3:
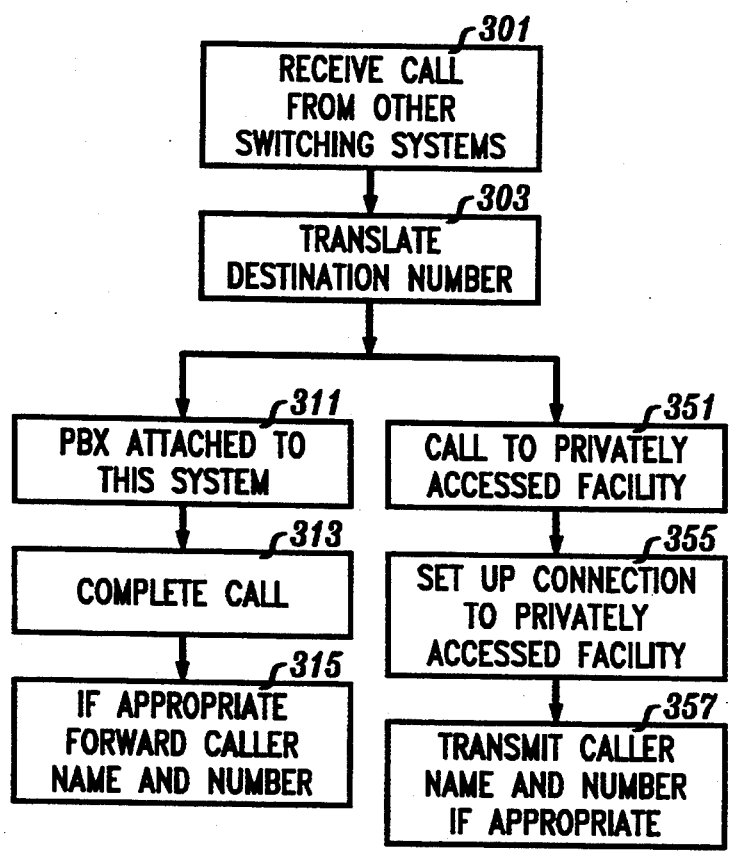

FIG. 3 is a flow chart of actions performed by a switch such as switching system 30 when receiving a call from another switching system such as switching system 31. The same basic flow diagram describes the actions except that many of the corresponding blocks have the same designation number except with the 3 in the first digit instead of a 2. Further, the blocks corresponding to blocks 221, 223, 225, 23 1,233,235, 241,243,245, 253, 261,263, are not required in this flow chart because the call has already been received from another switching system.

Figure 4:
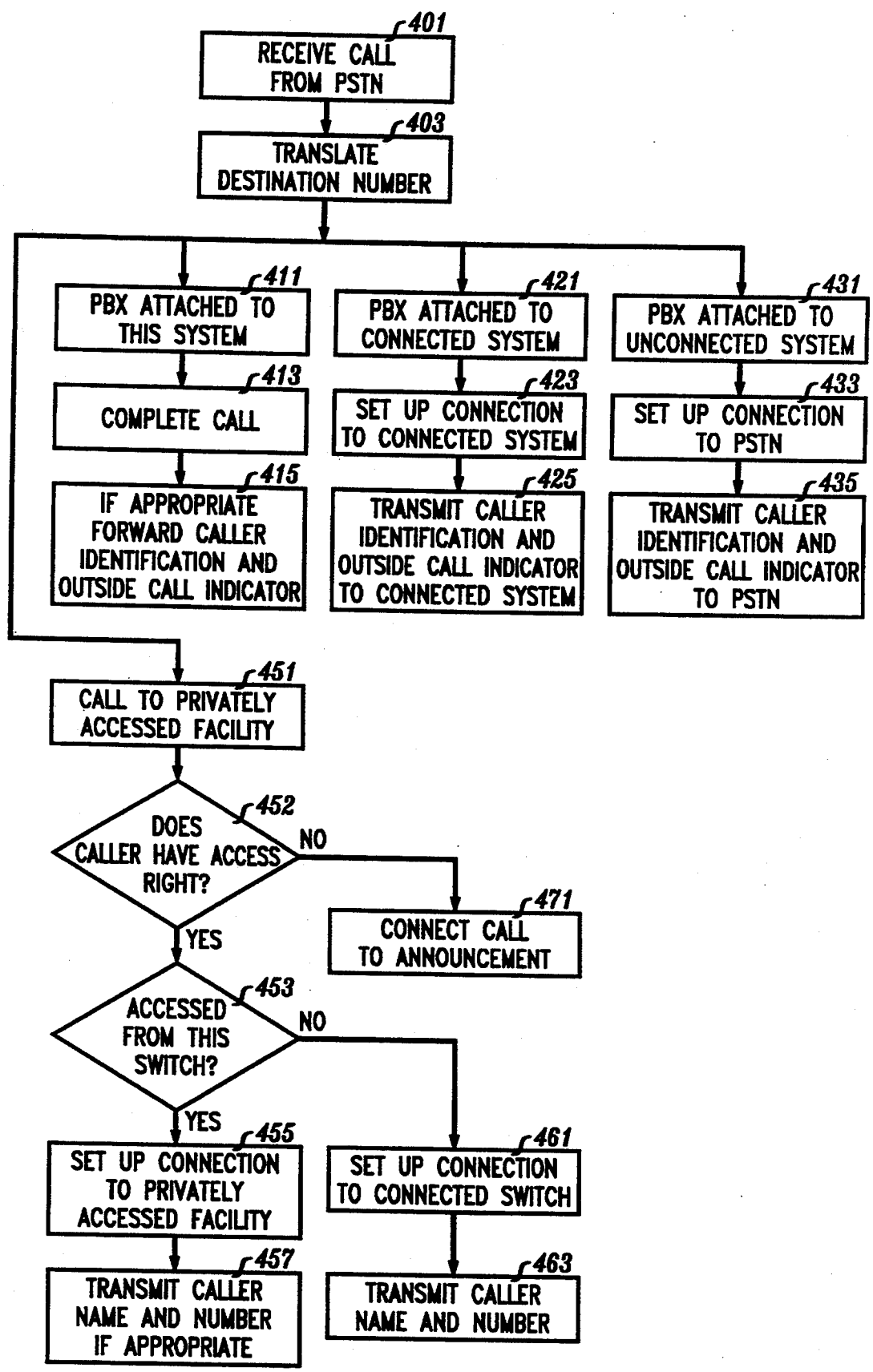

FIG. 4 is a flow chart of actions performed switching system 30 in response to calls received from the public switched telephone network. Again, most of the blocks of FIG. 4 are the same as corresponding blocks of FIG. 2 and some have been eliminated. The blocks that have been eliminated are blocks equivalent to blocks 241,243, and 245. In addition, a number of the other blocks have been changed and these changes will be described.

Block 415 includes forwarding the caller identification and an outside call indicator unless a customer group indicator had been received as a result of the transmission of such an indicator in block 235.

Block 425 differs from block 225 in that the caller identification is transmitted since it may not be possible to identify the name of the caller if the call is from a line and of course the indication signal would be that the call is an outside call.

Similarly, action block 435 is similar to action block 235 except that only the caller identification is transmitted and the outside call indicator is transmitted.

The actions associated with block 451 (corresponding to block 251) for accessing privately accessed facilities from the public switched telephone network differ in one respect. Before the caller can be given access to the facility, the caller's access fights must be checked (test 452). This may be by requesting that the caller dial some personal identification number, or by testing the caller's number identification, ascertained by Automatic Number Identification (ANI). If the caller does not have access rights, then the caller is connected to an announcement (action block 47 1) announcing this denial. Otherwise, the actions starting from test 453 (corresponding to test 253) are the same as the actions described with respect to blocks 253,255, 257,261, and 263 of FIG. 2.

FIG. 5 is a flow diagram of actions performed within a PBX such as PBX 1. If the call is received from the switch (action block 501) then the called number is translated to find its location within the PBX and to find out the type of station involved (action block 503) prior to establishing a connection to the called station. If the call is received from a station within the PBX (action block 511) then the called number is translated (action block 513) and if the call is within the PBX (action block 515), steps starting with action block 521 are performed to establish a connection to the called station. If the result of translation 5 13 is that the call is not within the PBX, that the called number is not one served by the PBX, then the call is connected to the switching system and the calling and called number are forwarded to that system (action block 517). Thereafter, the actions described with respect to FIG. 2 are performed by that switching system.

After it has been established that the call is to a station within the PBX and the translation has been performed, a connection is established to the called station (action block 521). If the called station has a display, then the display for that called station is controlled on the basis of information received from the switch or on the basis of the identity of the caller if the call is an intra-PBX call. If the PBX group has facilities for voice messaging and the called station is busy or does not answer (action block 525) then the call is forwarded to the voice messaging system by requesting the connected switch to establish a connection such as the connection to block 56. The called number and calling number are transmitted to the voice messaging system when the connection to that system is established.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. Apparatus for serving a multi-station customer, comprising:
   at least two private branch exchanges (PBXs) each for serving a group of stations of said customer;
   a plurality of serving switching systems for serving said PBXs;
   wherein said PBXs are each connected to one of said serving switching systems via at least one Integrated Services Digital Network (ISDN) Primary Rate Interface (PRI) facility;
   wherein said serving switching systems are interconnected by facilities for transmitting ISDN signals;
   wherein ISDN stations on one of said PBXs can communicate, using ISDN signals, with ISDN stations on another of said PBXs via ones of said serving switching systems;
   wherein call control signals for inter-PBX calls of said multi-station customer are exchanged between a specific PBX of said multi-station customer and a serving switching system to which said specific PBX is connected; and
   wherein ones of said serving switching systems comprise translation data for associating any internal customer directory number with any customer station.

2. The apparatus of claim 1 further comprising a switching system for serving Centrex stations of said customer, said switching system for serving Centrex stations interconnected by facilities, for transmitting ISDN signals, with ones of said serving switching systems.

3. The apparatus of claim 1 wherein ones of said serving switching systems are interconnected with each other over the public switched telephone network for transmitting ISDN signals.

4. The apparatus of claim 1 wherein ones of said serving switching systems are interconnected by facilities dedicated to said customer for transmitting PRI signals.

5. The apparatus of claim 1 wherein calls to a directory number of ones of said stations are initially routed to a serving switching system that is not connected to the called station and is not a system for serving a PBX connected to the called station.

6. The apparatus of claim 1 wherein one of said serving switching systems has access to private facilities of said customer and wherein stations of said customer not served by said one serving switching system access said private facilities via said one serving switching system.

7. The apparatus of claim 6 wherein said private facilities comprise transmission facilities for accessing a remote PBX or central office switching system.

8. The apparatus of claim 6 wherein ones of the stations of said customer are permitted access to ones of said private facilities, and others of the stations of said customer are not permitted access to said ones of said private facilities.

9. The apparatus of claim 6 wherein ones of said private facilities are accessible from a telephone station outside said customer group after having been authorized by one of said serving switching systems.

10. The apparatus of claim 1 wherein ones of said stations are analog stations.

11. The apparatus of claim 1 wherein one of said serving switching systems comprises a voice messaging system for use by stations not served from said serving switching system.

12. The apparatus of claim 1 wherein the interconnection facilities among said serving switching systems are used to transport incoming calling line identification data.

13. The apparatus of claim 1 wherein the interconnection facilities among said serving switching systems are used for transmitting data identifying a caller of an intra-customer call.

14. The apparatus of claim 1 wherein ones of said PBXs are interconnected by facilities dedicated to said customer for transmitting primary rate interface signals.

15. Apparatus for serving a multi-station customer, comprising:
    a private branch exchange (PBX) for serving a group of stations of said customer;
    a switching system for serving said PBX and an additional plurality of Integrated Services Digital Network (ISDN) Centrex stations;
    wherein said PBX is connected to the serving switching system via at least one ISDN Primary Rate Interface (PRI) facility;
    wherein ISDN stations on said PBXs can communicate, using ISDN signals, with said ISDN Centrex stations; and
    wherein the serving switching system comprises translation data for associating any internal customer directory number with any Centrex customer station or with stations served by said PBX.

16. The apparatus of claim 15 wherein the serving switching system has access to private facilities of said customer.

17. The apparatus of claim 16 wherein said private facilities comprise transmission facilities for accessing a remote PBX or central office switching system.

18. The apparatus of claim 16 wherein ones of the stations of said customer are permitted access to ones of said private facilities, and others of said stations are not permitted access to said ones of said private facilities.

19. The apparatus of claim 16 wherein ones of said private facilities are accessible from a telephone station outside said customer group after having been authorized by one of the serving switching systems.

20. The apparatus of claim 15 wherein ones of said stations are analog stations.

21. The apparatus of claim 15 wherein the at least one ISDN facility connecting said switching system to said PBX and said ISDN Centrex stations is used for transmitting data identifying a caller of an intra-customer call.

* * * * *